(12) United States Patent
Holz et al.

(10) Patent No.: US 11,549,566 B2
(45) Date of Patent: Jan. 10, 2023

(54) HYDRAULICALLY DAMPING MOUNT

(71) Applicant: Vibracoustic SE, Darmstadt (DE)

(72) Inventors: Roland Holz, Fürth (DE); Stefan Gölz, Weinheim (DE); Robert Jambor, Ketsch (DE); Tina Heilmann, Hockenheim (DE)

(73) Assignee: Vibracoustic SE, Darmstadt (DE)

( * ) Notice: Subject to any disclaimer, the term of this patent is extended or adjusted under 35 U.S.C. 154(b) by 0 days.

(21) Appl. No.: 16/965,416

(22) PCT Filed: Dec. 21, 2018

(86) PCT No.: PCT/EP2018/086549
§ 371 (c)(1),
(2) Date: Jul. 28, 2020

(87) PCT Pub. No.: WO2019/149431
PCT Pub. Date: Aug. 8, 2019

(65) Prior Publication Data
US 2021/0033166 A1 Feb. 4, 2021

(30) Foreign Application Priority Data
Jan. 31, 2018 (DE) ..................... 10 2018 102 130.5

(51) Int. Cl.
*F16F 13/10* (2006.01)
*B60K 5/12* (2006.01)
*F16F 13/26* (2006.01)

(52) U.S. Cl.
CPC .......... *F16F 13/106* (2013.01); *B60K 5/1208* (2013.01); *F16F 13/266* (2013.01); *F16F 2222/12* (2013.01); *F16F 2224/025* (2013.01)

(58) Field of Classification Search
CPC ...... F16F 13/106; F16F 13/107; F16F 13/266; F16F 2222/12; F16F 2224/025; B60K 5/1208
See application file for complete search history.

(56) References Cited

U.S. PATENT DOCUMENTS 4,651,980 A * 3/1987 Morita ................... F16F 13/106
267/140.13
4,708,329 A * 11/1987 Tabata ..................... F16F 13/10
267/140.13
(Continued)

FOREIGN PATENT DOCUMENTS

CN 101813154 A 8/2010
CN 202091425 U 12/2011
(Continued)

OTHER PUBLICATIONS

International Search Report, PCT/EP2018/086549, dated Mar. 19, 2019.
(Continued)

*Primary Examiner* — Robert A. Siconolfi
*Assistant Examiner* — James K Hsiao
(74) *Attorney, Agent, or Firm* — Fishman Stewart PLLC

(57) ABSTRACT

A hydraulically damping mount for mounting a motor vehicle unit on a motor vehicle body includes a support and a support mount which are interconnected by a support spring made of an elastomeric material. In embodiments, a support spring limits a working chamber which is separated from a compensating chamber by a separating device, wherein the working chamber and the compensating chamber may be filled with a fluid and may be connected to one another via a damping channel included in the separating device, wherein the separating device may include two nozzle discs between which a first membrane and a second
(Continued)

membrane are arranged, and wherein one of the membranes has at least one through-hole.

12 Claims, 1 Drawing Sheet

(56) References Cited

U.S. PATENT DOCUMENTS

| | | | | |
|---|---|---|---|---|
| 4,925,162 A * | 5/1990 | Kojima | ................ | F16F 13/106 |
| | | | | 267/122 |
| 6,390,459 B2 * | 5/2002 | Saitoh | ................... | F16F 13/106 |
| | | | | 267/140.13 |
| 6,612,554 B1 * | 9/2003 | Linn | ..................... | F16F 13/105 |
| | | | | 267/140.13 |
| 7,258,331 B2 * | 8/2007 | Schneider | ............ | F16F 13/105 |
| | | | | 267/140.13 |
| 8,240,644 B2 | 8/2012 | Lemaire et al. | | |
| 9,366,309 B2 * | 6/2016 | Marienfeld | ........... | F16F 13/264 |
| 10,436,281 B2 * | 10/2019 | Kim | .................... | B60K 5/1225 |
| 10,584,761 B2 * | 3/2020 | Fourman | .............. | F16F 13/107 |
| 2005/0173211 A1 | 8/2005 | Hopkins et al. | | |
| 2005/0206056 A1 * | 9/2005 | Maeno | ................. | F16F 13/106 |
| | | | | 267/140.13 |
| 2009/0140477 A1 * | 6/2009 | Michiyama | ........... | F16F 13/106 |
| | | | | 267/121 |
| 2010/0213650 A1 | 8/2010 | Katayama et al. | | |
| 2013/0069289 A1 * | 3/2013 | Ishikawa | .............. | F16F 13/106 |
| | | | | 267/140.13 |
| 2013/0154171 A1 * | 6/2013 | Nishi | ...................... | F16F 13/08 |
| | | | | 267/140.13 |
| 2014/0327199 A1 * | 11/2014 | Kanaya | .................. | F16F 13/08 |
| | | | | 267/140.13 |
| 2015/0330476 A1 * | 11/2015 | Satori | ..................... | F16F 13/10 |
| | | | | 267/140.13 |
| 2015/0337919 A1 * | 11/2015 | Kojima | ................... | F16F 13/08 |
| | | | | 267/140.13 |
| 2016/0053844 A1 * | 2/2016 | Nagasawa | ............. | F16F 13/106 |
| | | | | 267/140.13 |
| 2017/0089420 A1 * | 3/2017 | Kadowaki | ............ | B60K 5/1208 |
| 2018/0051769 A1 * | 2/2018 | Kim | ...................... | F16F 13/106 |
| 2019/0017567 A1 | 1/2019 | Kim | | |
| 2019/0092155 A1 * | 3/2019 | Inoue | .................... | F16F 13/266 |

FOREIGN PATENT DOCUMENTS

| | | |
|---|---|---|
| CN | 103221712 A | 7/2013 |
| CN | 205523647 U | 8/2016 |
| CN | 109253206 A | 1/2019 |
| DE | 19801277 C2 | 8/2001 |
| DE | 10144021 A1 | 5/2002 |
| DE | 60014016 T2 | 11/2005 |
| DE | 102012006752 A1 | 10/2013 |
| EP | 0848183 A2 | 6/1998 |
| EP | 2180207 A1 | 4/2010 |
| EP | 2428698 A2 | 3/2012 |
| EP | 2840281 A1 | 2/2015 |
| EP | 3045766 A1 | 7/2016 |
| JP | 2002096645 A | 4/2002 |
| WO | 2006011231 A1 | 2/2006 |

OTHER PUBLICATIONS

Chinese Search Report, 2018800879585, dated Aug. 13, 2021, with machine translation.
Chinese Office Action, 201880087958.5, dated Aug. 25, 2021, with translation.
Supplemental Chinese Search Report, 2018800879585, dated Feb. 3, 2022.
Indian Office Aciton, Appl. No. 202017032072, dated Mar. 4, 2022.

* cited by examiner

HYDRAULICALLY DAMPING MOUNT

CROSS-REFERENCE TO RELATED APPLICATIONS

This application is a National Stage Patent Application of International Patent Application No. PCT/EP2018/086549, filed Dec. 21, 2018, which claims the benefit of German Application Serial No. 10 2018 102 130.5, filed Jan. 31, 2018, the contents of each are incorporated by reference in their entireties.

TECHNICAL FIELD

The present invention relates to a hydraulically damping mount for mounting a motor vehicle unit on a motor vehicle body, including hydraulic damping mounts comprising a support and a support mount which are interconnected by a support spring made of an elastomeric material, the support spring limiting a working chamber which is separated from a compensating chamber by a separating device, the working chamber and the compensating chamber being filled with a fluid and interconnected by a damping channel included in the separating device.

BACKGROUND

A hydraulically damping mount of the type mentioned above is also known as a hydromount and is used to support a motor vehicle unit or a transmission on a motor vehicle body in order to dampen the vibrations caused by the uneven road surface and to isolate acoustic vibrations.

The damping of the high amplitude and low frequency vibrations induced by the motor vehicle unit is achieved by a hydraulic system formed by the fluid-filled working chamber, the fluid-filled compensating chamber and the damping channel. The induced vibrations cause the support spring to move, thus building up hydraulic pressure within the working chamber. As a result of this pressure, the fluid flows from the working chamber via the damping channel into the compensating chamber. Due to the small diameter of the damping channel and the associated high mechanical transmission ratio resulting from the equivalent, displaced cross-section of the support spring in relation to the damping channel cross-section, the induced vibrations are damped or absorbed.

The damping of high-frequency, small-amplitude vibrations, i.e. in the acoustically relevant range, is achieved by a membrane arranged between two nozzle discs. The membrane vibrates at high-frequency, small-amplitude vibrations and thus decouples the damping via the damping channel. This reduces an increase in the dynamic rigidity of the mount.

DE 198 01 277 C2 discloses a hydraulically damping mount with a membrane having a cavity which is limited by a wall of elastic material, a spacer device inhibiting the collapse of the cavity being provided in the cavity.

The present disclosure provides a hydraulically damping mount which has an improved decoupling of the vibrations in the acoustically relevant range.

A hydraulically damping mount with the characteristics, such as described further herein, is disclosed.

Advantageous embodiments of the hydraulically damping mount are also disclosed herein.

SUMMARY

A hydraulically damping mount for mounting a motor vehicle unit on a motor vehicle body may comprise a support and a support mount which are interconnected by a support spring made of an elastomeric material, the support spring limiting a working chamber which is separated from a compensating chamber by a separating device, the working chamber and the compensating chamber being filled with a fluid and interconnected via a damping channel included in the separating device, wherein the separating device has two nozzle discs between which a first membrane and a second membrane are arranged, one of the membranes having at least one through-hole.

Together with the at least one through-hole, the two membranes reduce the loss angle and the dynamic rigidity of the hydraulically damping mount during high-frequency, low-amplitude vibrations. As a result, the hydraulically damping mount exhibits improved decoupling in the acoustically relevant range. Via the through-hole, the fluid can flow directly to the membrane that does not have a through-hole. The two membranes are preferably arranged one above the other. In particular, the through-hole is aligned with an opening or flow-through opening included in the nozzle disc and facing the working chamber. In the context of this disclosure, a through-hole is understood to be a hole which completely penetrates the membrane.

In an advantageous embodiment, the membrane has a plurality of through-holes. The function, i.e. the reduction of the loss angle as well as the dynamic rigidity of the mount can be adjusted via the number of through-holes.

In an advantageous embodiment, the through-holes are evenly and/or unevenly spaced from one another. For example, a first group of through-holes may be evenly spaced from one another, while a second group of through-holes may be unevenly spaced from one another. Further, a first group of through-holes may be equally spaced from one another and a second group of through-holes may also be evenly spaced from one another, the first group of through-holes being unevenly or evenly spaced from the second group of through-holes.

In an advantageous embodiment, the through-holes form a hole circle. In particular, the through-holes are arranged as a hole circle around a through-hole included in the membrane. Furthermore, a first group of through-holes can form a first hole circle and a second group of through-holes can form a second hole circle.

In an advantageous embodiment, the membrane facing the working chamber has at least one through-hole. As a result, the other membrane is directly impacted by the fluid in the working chamber and the fluid in the compensating chamber and is set in vibration. In particular, the through-hole is aligned with an opening or flow-through opening in the nozzle disc.

In an advantageous embodiment, the through-hole is round, rectangular or polygonal in cross-section.

In an advantageous embodiment, at least one of the membranes has a structured surface. The loss angle and the dynamic rigidity of the mount can be adjusted via the structured surface. In particular, the structured surface is formed as shoe sole profile and/or wave profile. Preferably, both membranes have a structured surface.

In an advantageous embodiment, the membranes are loosely received or clamped between the two nozzle discs. The membranes can be clamped at their outer edges and/or at their inner edges by the nozzle discs. Furthermore, the membranes can be clamped between the two nozzle discs over their entire surface. Furthermore, the membranes may be clamped in sections between the clamped outer edges and/or inner edges of the nozzle discs.

In an advantageous embodiment, the membranes are made of an elastic material. Preferably, the membranes are made of an elastomer.

In an advantageous embodiment, an absorber channel which can be opened and closed by means of an actuator is inserted into the separating device. The absorber channel connects the working chamber with the compensating chamber. When the absorber channel is open, a fluid column can vibrate in the absorber channel, which lowers the dynamic spring rate of the hydraulically damping mount. The actuator can be formed as a switching device which can be switched electrically or pneumatically.

BRIEF DESCRIPTION OF THE DRAWINGS

In the following, a hydraulically damping mount as well as further features and advantages are explained in more detail by means of an exemplary embodiment, which is shown schematically in the figures.

DETAILED DESCRIPTION

Figure 1:
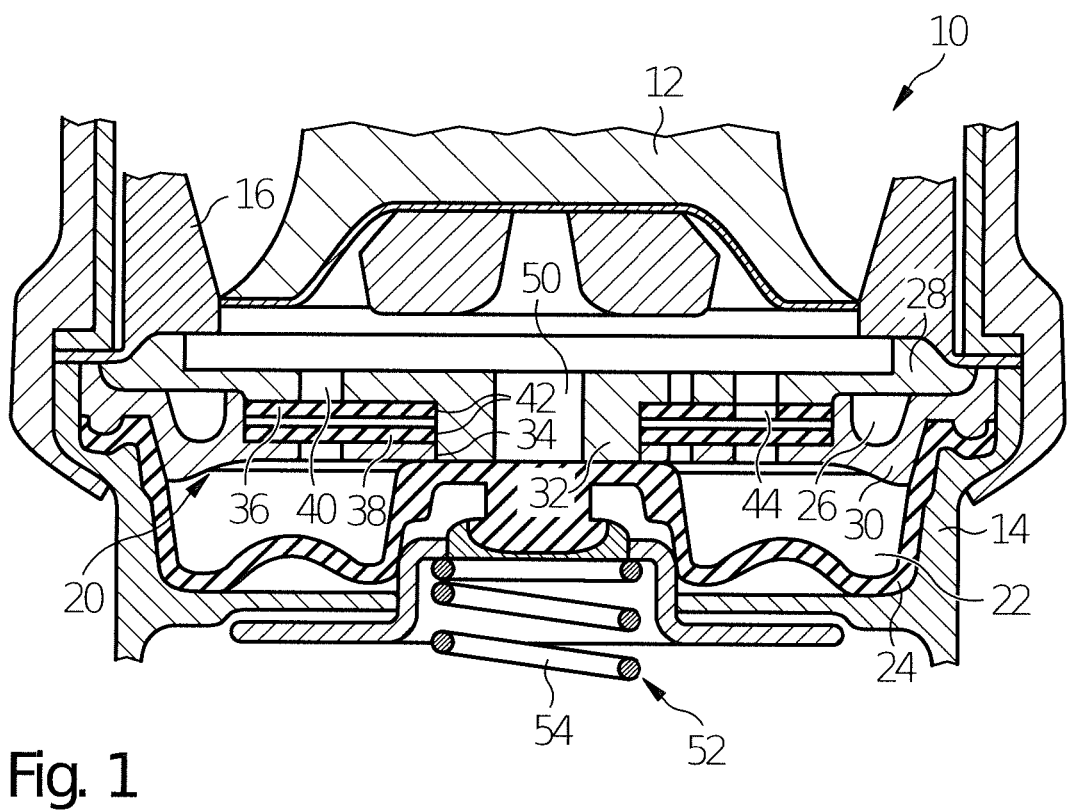
FIG. 1 shows a vertical section through a hydraulically damping mount.

In FIG. 1, a hydraulically damping mount 10 is shown, which is used to mount a vehicle power unit, such as a vehicle engine or a transmission, on a vehicle body.

The hydraulically damping mount 10 has a support mount 12 and a support 14, which are interconnected by a support spring 16 made of an elastomeric material. A fastening device, usually in the form of a bolt, is included in the support mount 12, by means of which the hydraulically damping mount 10 can be fastened to a motor vehicle unit.

The static loads acting on the hydraulically damping mount 10 are absorbed by the support spring 16. At the same time, the support spring provides acoustic insulation.

The support mount 12, the support 14 and the support spring 16 limits a working chamber 18, which is separated from a compensating chamber 22 by a separating device 20. The compensating chamber 22 is limited to the outside by a compensating membrane 24. The working chamber 18 and the compensating chamber 22 are filled with a fluid and are in fluid connection with one another via a damping channel 26 included in the separator 20.

The working chamber 18, the compensating chamber 22 and the damping channel 26 form a hydraulic system that dampens or absorbs the low-frequency vibrations with large amplitudes induced by the motor vehicle unit. The induced vibrations cause a movement of the support spring 16, thus building up hydraulic pressure within the working chamber 18. As a result of the pressure, the fluid flows from the working chamber 18 via the damping channel 26 into the compensating chamber 22. Due to the small diameter of the damping channel 26 and the associated high mechanical transmission ratio resulting from the equivalent, displaced cross-section of the support spring 16 in relation to the damping channel cross-section, the induced vibrations are damped or absorbed.

As can be seen in FIG. 1, the separating device 20 has a first nozzle disc 28 and a second nozzle disc 30. The first nozzle disc 28 corresponds to the working chamber 18 and the second nozzle disc 30 corresponds to the compensating chamber 22. The first nozzle disc 28 has a cylindrical projection 32 which engages with an opening 34 of the second nozzle disc 30.

A first membrane 36 and a second membrane 38 made of an elastomeric material are arranged between the two nozzle discs 28, 30. The fluid in the working chamber 18 and the compensating chamber 22 flows against the membranes via flow-through openings 40 included in the nozzle discs 28, 30.

The membranes 36, 38 are loosely received between the two nozzle discs 28, 30 and serve to decouple high-frequency, small-amplitude vibrations, i.e. in the acoustically relevant range in which the membrane 32 vibrates with high-frequency small-amplitude vibrations, thereby decoupling a damping via the damping channel 26.

As can be seen in FIG. 1, each of the membranes 36, 38 has a through-opening 42, through which the cylindrical projection 32 of the first nozzle disc 28 extends.

Figure 2:
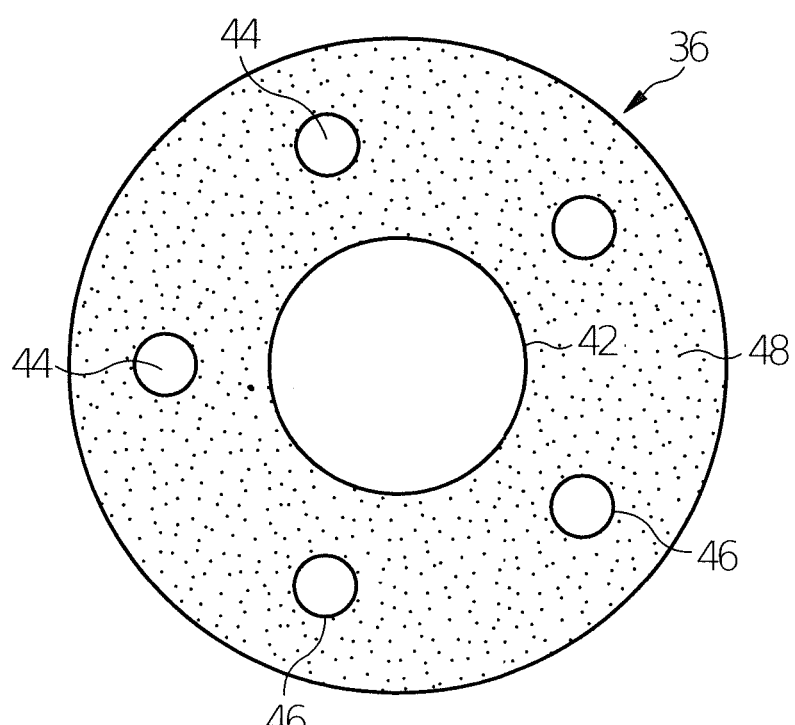
FIG. 2 shows a top view of a membrane with through-holes.

As can also be seen in FIGS. 1 and 2, the first membrane 36 has several through-holes 44 arranged around the through opening 42 and forming a hole circle 46. The through-holes 44 are aligned with the flow-through openings 40 of the first nozzle disc 28 and face the working chamber 18. As a result, the fluid in the working chamber 18 and the compensating chamber 2 flows directly to the second membrane 38.

Due to the two membranes 36, 38 lying one above the other and the through-holes 40 included in the first membrane 36, the loss angle as well as the dynamic rigidity of the hydraulically damping mount 10 can be reduced.

Further, the membranes 36, 38 have a structured surface 48, as shown in FIG. 2. The structured surface 48 is approximately modelled on a shoe sole profile and causes a reduction of the loss angle as well as the dynamic rigidity of the hydraulically damping mount 10. As can also be seen in FIG. 1, an absorber channel 50, which can also be described as an idling channel, is inserted into the isolating device 20 and can be opened and closed by means of an actuator formed as switching device 52.

In the open position, the absorber channel 50 reduces the dynamic mount rigidity when the engine is idling. In the open position, the liquid column inside the absorber channel 50 can vibrate, so that the high-frequency engine vibrations occurring when the engine is idling are transmitted to a motor vehicle body in a significantly reduced form due to the small effective spring rate.

When the absorber channel 50 is closed, the hydraulically damping mount 10 operates like a conventional mount by damping low-frequency vibrations with high amplitude by a fluid displacement within the damping channel 26 and isolating or decoupling high-frequency vibrations with low amplitude by means of the membrane 36.

The switching device 52 has a spring element 54 which is connected to the compensating membrane 24. The spring element 54 presses the compensating membrane 24 against the separating device 20 to close the absorber channel 50. To open the absorber channel 50, the switching device 52 is connected via a port to a vacuum source, whereby by applying a vacuum the compensating membrane 24 is moved against the force of the spring element 54 away from the separating device 20 in order to open the absorber channel 50.

The invention claimed is:

1. A hydraulically damping mount for mounting a motor vehicle unit on a motor vehicle body, the hydraulic damping mount comprising a support and a support mount that are interconnected by a support spring made of an elastomeric material, the support spring limiting a working chamber that is separated from a compensating chamber by a separating device, the working chamber and the compensating chamber being filled with a fluid and interconnected via a damping channel included in the separating device, wherein the separating device has two nozzle discs between which a first diaphragm and a second diaphragm are arranged, wherein the first diaphragm has at least one through-hole and the second diaphragm does not include a through-hole, wherein the first diaphragm and the second diaphragm are made of an elastic material, and wherein the fluid can flow directly to the second diaphragm from the first diaphragm.

2. The hydraulically damping mount according to claim 1, wherein the first diaphragm has a plurality of through-holes.

3. The hydraulically damping mount according to claim 2, wherein the plurality of through-holes are spaced evenly from one another.

4. The hydraulically damping mount according to claim 2, wherein the plurality of through-holes are spaced unevenly from one another.

5. The hydraulically damping mount according to claim 2, wherein the plurality of through-holes form a hole circle.

6. The hydraulically damping mount according to claim 1, wherein the first diaphragm faces the working chamber.

7. The hydraulically damping mount according to claim 1, wherein the at least one through-hole is round in cross-section.

8. The hydraulically damping mount according to claim 1, wherein the at least one through-hole is rectangular in cross-section.

9. The hydraulically damping mount according to claim 1, wherein the at least one through-hole is polygonal in cross-section.

10. The hydraulically damping mount according to claim 1, wherein at least one of the first and second diaphragms has a structured surface.

11. The hydraulically damping mount according to claim 1, wherein the first and second diaphragms are received loosely and/or clamped between the two nozzle discs.

12. The hydraulically damping mount according to claim 1, wherein an idling channel is configured to be opened and closed by an actuator and is included in the separating device.

* * * * *